3,562,225
METHOD OF INHIBITING PREMATURE VULCANIZATION OF DIENE RUBBERS WITH BIS-THIOIMIDES
Aubert Yaucher Coran, Creve Coeur, Mo., and Joseph Edward Kerwood, St. Albans, W. Va., assignors to Monsanto Company, St. Louis, Mo., a corporation of Delaware
No Drawing. Continuation-in-part of applications Ser. No. 459,466, May 27, 1965; Ser. No. 549,730, May 12, 1966; and Ser. No. 579,493, Sept. 15, 1966, now abandoned in view of continuation-in-part application Ser. No. 714,445, Mar. 20, 1968; and continuation of application Ser. No. 646,202, June 15, 1967. This application Jan. 15, 1968, Ser. No. 697,615
Int. Cl. C08f 27/06
U.S. Cl. 260—79.5
10 Claims

ABSTRACT OF THE DISCLOSURE

New compounds with a nucleus of

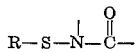

where the dangling valence on the nitrogen is linked to a second carbonyl and R is alkyl, aryl, or cycloalkyl are inhibitors of premature vulcanization of diene rubbers. The R may be substituted to give a bis-sulfenimide of the formula R'—S—R—S—R' where R is an alkane, arylene, or cycloalkane and R' is an imide. A combination of a vulcanization accelerator and an inhibitor of this invention is an improved rubber additive which allows longer and safer processing time for rubber.

CROSS-REFERENCE TO RELATED APPLICATIONS

This application is a continuation of application Ser. No. 646,202 filed June 15, 1967, now abandoned, a continuation-in-part of the copending application Ser. No. 579,493, filed Sept. 15, 1966, now abandoned in view of continuation-in-part application Ser. No. 714,445, filed Mar. 20, 1968, a continuation-in-part of the copending application Ser. No. 549,730, filed May 12, 1966, now abandoned, and a continuation-in-part of the copending application Ser. No. 459,466, filed May 27, 1965, now abandoned.

BACKGROUND OF THE INVENTION

The invention pertains to the field of controlled-rubber vulcanization art. The applicable U.S. patent classification defines the invention as "retarders."

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally, the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occus during the storage of the crude mixture or during processing prior to vulcanization, the processing operations cannot be carried out because the scorched rubber is rough and lumpy, consequently, useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfenamide accelerators constituted a major breakthrough in the vulcanization art, because thiazolesulfenamides delayed onset of the vulcanizing process; but, once it started, the built-in amine activation of the thiazole resulted in strong, rapid curing. Mercaptobenzothiazole is a valuable organic vulcanization accelerator but by present standards would be considered scorchy. It has been largely replaced by the delayed-action accelerators. The development of high pH furnace blacks which lack the inherent inhibiting effect of the acidic channel blacks and popularity of certain phenylenediamine antidegradants which promote scorching have placed increasingly stringent demands on the accelerator system.

Retarders have long been available to rubber compounders. These include N-nitrosodiphenylamine, salicyclic acid, and a terpene-resin acid blend. See editors of Rubber World, "Compounding Ingredients for Rubber," 125–128 (3rd ed., 1965). Acids as retarders are generally ineffective with thiazolesulfenamide accelerators or adversely affect this vulcanizing process. Nitrosoamines as retarders are only of limited effectiveness with thiazolesulfenamides derived from primary amines.

SUMMARY

We have discovered a class of sulfenimides which are extremely valuable inhibitors of premature vulcanization. The characteristic nucleus is

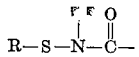

where the dangling valence on the nitrogen is linked to a second carbonyl and R is alkyl, aryl, or cycloalkyl. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. Alkyl is used in the usual generic sense to mean univalent aliphatic radicals of the Series $C_nH_{2n+1}$. Primary, secondary, and tertiary alkyls are included for example, straight or branched chains. The term cycloalkyl includes cycloalkyl radicals of 5 to 8 carbon atoms in the ring. The R may be substituted to give a bis-sulfenimide of the formula R'—S—R—S—R' where R is an alkane, arylene, or cycloalkane and R' is an imide. A combination of an accelerator and an inhibitor of this invention is an improved rubber additive which allows longer and safer processing time.

DESCRIPTION OF THE PREFERRED EMBODIMENTS

Our invention is that bis-sulfenimides having the formula $$R'—S—R—S—R'$$

are excellent premature vulcanization inhibitors for a vulcanizable diene rubber where R is an alkane, arylene, or cycloalkane and R' is an imide. Examples of the compounds useful in this invention are as follows:

1,1-bis(2-thiophthalimido)methane
1,2-bis(2-thiophthalimido)ethane
1,3-bis(2-thiophthalimido)propane
1,2-bis(2-thiophthalimido)isopropane
1,4-bis(2-thiophthalimido)butane
1,3-bis(2-thiophthalimido)-3-isobutane
1,5-bis(2-thiophthalimido)pentane
1,6-bis(2-thiophthalimido)hexane
1,7-bis(2-thiophthalimido)heptane
1,8-bis(2-thiophthalimido)octane
1,4-bis(2-thiophthalimido)cyclohexane
1,4-bis(2-thiophthalimido)benzene
1,4-bis(2-thiophthalimido)nitrobenzene
1,4-bis(2-thiophthalimido)toluene
1,1-bis(2-thiosuccinimido)methane
1,2-bis(2-thiosuccinimido)ethane
1,3-bis(2-thiosuccinimido)propane
1,2-bis(2-thiosuccinimido)isopropane
1,4-bis(2-thiosuccinimido)butane
1,3-bis(2-thiosuccinidimo)-3-isobutane
1,5-bis(2-thiosuccinimido)pentane
1,6-bis(2-thiosuccinimido)hexane
1,7-bis(2-thiosuccinimido)heptane
1,8-bis(2-thiosuccinimido)octane
1,4-bis(2-thiosuccinimido)cyclohexane
1,4-bis(2-thiosuccinimido)benzene
1,4-bis(2-thiosuccinimido)nitrobenzene
1,4-bis(2-thiosuccinimido)toluene
1,1-bis(2-thioglutarimido)methane
1,2-bis(2-thioglutarimido)ethane
1,3-bis(2-thioglutarimido)propane
1,2-bis(2-thioglutarimido)isopropane
1,4-bis(2-thioglutarimido)butane
1,3-bis(2-thioglutarimido)-3-isobutane
1,5-bis(2-thioglutarimido)pentane
1,6-bis(2-thioglutarimido)hexane
1,7-bis(2-thioglutarimido)heptane
1,8-bis(2-thioglutarimido)octane
1,4-bis(2-thioglutarimido)cyclohexane
1,4-bis(2-thioglutarimido)benzene
1,4-bis(2-thioglutarimido)nitrobenzene
1,4-bis(2-thioglutarimido)toluene
1,1-bis(2-thiomaleimido)methane
1,2-bis(2-thiomaleimido)ethane
1,3-bis(2-thiomaleimido)propane
1,2-bis(2-thiomaleimido)isopropane
1,4-bis(2-thiomaleimido)butane
1,3-bis(2-thiomaleimido)-3-isobutane
1,5-bis(2-thiomaleimido)pentane
1,6-bis(2-thiomaleimido)hexane
1,7-bis(2-thiomaleimido)heptane
1,8-bis(2-thiomaleimido)octane
1,4-bis(2-thiomaleimido)cyclohexane
1,4-bis(2-thiomaleimido)benzene
1,4-bis(2-thiomaleimido)nitrobenzene
1,4-bis(2-thiomaleimido)toluene
1,1-bis(2-thionaphthalimido)methane
1,2-bis(2-thionaphthalimido)ethane
1,3-bis(2-thionaphthalimido)propane
1,2-bis(2-thionaphthalimido)isopropane
1,4-bis(2-thionaphthalimido)butane
1,3-bis(2-thionaphthalimido)-3-isobutane
1,5-bis(2-thionaphthalimido)pentane
1,6-bis(2-thionaphthalimido)hexane
1,7-bis(2-thionaphthalimido)heptane
1,8-bis(2-thionaphthalimido)octane
1,4-bis(2-thionaphthalimido)cyclohexane
1,4-bis(2-thionaphthalimido)benzene
1,4-bis(2-thionaphthalimido)nitrobenzene
1,4-bis(2-thionaphthalimido)toluene
1,1-bis(N-thio-4-cyclohexene-1,2-dicarboximido)methane
1,2-bis(N-thio-4-cyclohexene-1,2-dicarboximido)ethane
1,3-bis(N-thio-4-cyclohexene-1,2-dicarboximido)propane
1,2-bis(N-thio-4-cyclohexene-1,2-dicarboximido)-isopropane
1,4-bis(N-thio-4-cyclohexene-1,2-dicarboximido)butane
1,3-bis(N-thio-4-cyclohexene-1,2-dicarboximido)-3-isobutane
1,5-bis(N-thio-4-cyclohexene-1,2-dicarboximido)pentane
1,6-bis(N-thio-4-cyclohexene-1,2-dicarboximido)hexane
1,7-bis(N-thio-4-cyclohexene-1,2-dicarboximido)heptane
1,8-bis(N-thio-4-cyclohexene-1,2-dicarboximido)octane
1,4-bis(N-thio-4-cyclohexene-1,2-dicarboximido)-cyclohexane
1,4-bis(N-thio-4-cyclohexene-1,2-dicarboximido)benzene
1,4-bis(N-thio-4-cyclohexene-1,2-dicarboximido)-nitrobenzene
1,4-bis(N-thio-4-cyclohexen-1,2-dicarboximido)toluene
1,1-bis(N-thio-1,4,5,6,7,7-hexachlorobicyclo[2.2.1]-hept-5-ene-2,3-dicarboximido)methane
1,2-bis(N-thio-1,4,5,6,7,7-hexachlorobicyclo[2.2.1]-hept-5-ene-2,3-dicarboximido)ethane
1,3-bis(N-thio-1,4,5,6,7,7-hexachlorobicyclo[2.2.1]-hept-5-ene-2,3-dicarboximido)propane
1,2-bis(N-thio-1,4,5,6,7,7-hexachlorobicyclo[2.2.1]-hept-5-ene-2,3-dicarboximido)isopropane
1,4-bis(N-thio-1,4,5,6,7,7-hexachlorobicyclo[2.2.1]-hept-5-ene-2,3-dicarboximido)butane
1,3-bis(N-thio-1,4,5,6,7,7-hexachlorobicyclo[2.2.1]hept-5-ene-2,3-dicarboximido)-3-isobutane
1,5-bis(N-thio-1,4,5,6,7,7-hexachlorobicyclo[2.2.1]hept-5-ene-2,3-dicarboximido)pentane
1,6-bis(N-thio-1,4,5,6,7,7-hexachlorobicyclo[2.2.1]hept-5-ene-2,3-dicarboximido)hexane
1,7-bis(N-thio-1,4,5,6,7,7-hexachlorobicyclo[2.2.1]hept-5-ene-2,3-dicarboximido)heptane
1,8-bis(N-thio-1,4,5,6,7,7-hexachlorobicyclo[2.2.1]hept-5-ene-2,3-dicarboximido)octane
1,4-bis(N-thio-1,4,5,6,7,7-hexachlorobicyclo[2.2.1]hept-5-ene-2,3-dicarboximido)cyclohexane
1,4-bis(N-thio-1,4,5,6,7,7-hexachlorobicyclo[2.2.1]hept-5-ene-2,3-dicarboximido)benzene
1,4-bis(N-thio-1,4,5,6,7,7-hexachlorobicyclo[2.2.1]hept-5-ene-2,3-dicarboximido)nitrobenzene
1,4-bis(N-thio-1,4,5,6,7,7-hexachlorobicyclo[2.2.1]hept-5-ene-2,3-dicarboximido)toluene
1,1-bis(N-thio-5,5-dimethylhydantoin)methane
1,2-bis(N-thio-5,5-dimethylhydantoin)ethane
1,3-bis(N-thio-5,5-dimethylhydantoin)propane
1,2-bis(N-thio-5,5-dimethylhydantoin)isopropane
1,4-bis(N-thio-5,5-dimethylhydantoin)butane
1,3-bis(N-thio-5,5-dimethylhydantoin)isobutane
1,5-bis(N-thio-5,5-dimethylhydantoin)pentane
1,6-bis(N-thio-5,5-dimethylhydantoin)hexane
1,7-bis(N-thio-5,5-dimethylhydantoin)heptane
1,8-bis(N-thio-5,5-dimethylhydantoin)octane
1,4-bis(N-thio-5,5-dimethylhydantoin)cyclohexane
1,4-bis(N-thio-5,5-dimethylhydantoin)benzene
1,4-bis(N-thio-5,5-dimethylhydantoin)nitrobenzene
1,4-bis(N-thio-5,5-dimethylhydantoin)toluene
1,1-bis(N-thiohexahydrophthalimido)methane
1,2-bis(N-thiohexahydrophthalimido)ethane
1,3-bis(N-thiohexahydrophthalimido)propane
1,2-bis(N-thiohexahydrophthalimido)isopropane
1,4-bis(N-thiohexahydrophthalimido)butane
1,3-bis(N-thiohexahydrophthalimido)isobutane
1,5-bis(N-thiohexahydrophthalimido)pentane
1,6-bis(N-thiohexahydrophthalimido)hexane
1,7-bis(N-thiohexahydrophthalimido)heptane
1,8-bis(N-thiohexahydrophthalimido)octane 1,4-bis(N-thiohexahydrophthalimido)cyclohexane
1,4-bis(N-thiohexahydrophthalimido)benzene
1,4-bis(N-thiohexahydrophthalimido)nitrobenzene, and
1,4-bis(N-thiohexahydrophthalimido)toluene.

Examples of other new compounds of this invention are:

N-(cyclohexylthio)phthalimide,
N-(cyclooctylthio)phthalimide,
N-(benzylthio)phthalimide,
N-(ethylthio)phthalimide,
N-(propylthio)phthalimide,
N-(isopropylthio)phthalimide,
N-(n-butylthio)phthalimide,
N-(tert-butylthio)phthalimide,
N-(isobutylthio)phthalimide,
N-(sec-butylthio)phthalimide,
N-(n-hexylthio)phthalimide,
N-(n-octylthio)phthalimide,
N-(n-dodecylthio)phthalimide,
N-(cyclohexylthio)adipimide,
N-(cyclooctylthio)adipimide,
N-(benzylthio)adipimide,
N-(ethylthio)adipimide,
N-(propylthio)adipimide,
N-(isopropylthio)adipimide,
N-(n-butylthio)adipimide,
N-(tert-butylthio)adipimide,
N-(isobutylthio)adipimide,
N-(sec-butylthio)adipimide,
N-(n-pentylthio)adipimide,
N-(n-heptylthio)adipimide,
N-(n-hexylthio)adipimide,
N-(n-octylthio)adipimide,
N-(n-dodecylthio)adipimide,
N-(phenylthio)adipimide,
N-(tolylthio)adipimide,
N-(cyclohexylthio)glutarimide,
N-(cyclooctylthio)glutarimide,
N-(benzylthio)glutarimide,
N-(ethylthio)glutarimide,
N-(propylthio)glutarimide,
N-(isopropylthio)glutarimide,
N-(n-butylthio)glutarimide,
N-(t-butylthio)glutarimide,
N-(isobutylthio)glutarimide,
N-(sec-butylthio)glutarimide,
N-(n-pentylthio)glutarimide,
N-(n-heptylthio)glutarimide,
N-(n-hexylthio)glutarimide,
N-(n-octylthio)glutarimide,
N-(n-dodecylthio)glutarimide,
N-(phenylthio)glutarimide,
N-(tolylthio)glutarimide,
N-(cyclohexylthio)-7-oxabicyclo[2.2.1]heptane-2,3-dicarboximide,
N-(cyclohexylthio)-7-oxabicyclo[2.2.1]hept-5-ene-2,3-dicarboximide,
N-(cyclohexylthio)hexahydrophthalimide,
N-(cyclohexylthio)maleimide,
N-(cyclooctylthio)maleimide,
N-(phenylthio)maleimide,
N-(chlorophenylthio)maleimide,
N-(tolylthio)maleimide,
N-(nitrophenylthio)maleimide,
N-(benzylthio)maleimide,
N-(t-butylthio)maleimide,
N-(ethylthio)maleimide,
N-(propylthio)maleimide,
N-(isopropylthio)maleimide,
N-(n-dodecylthio)maleimide,
5,5-dimethyl-3-(cyclohexylthio)hydantoin,
5,5-dimethyl-3-(cyclooctylthio)hydantoin,
5,5-dimethyl-3-(phenylthio)hydantoin,
5,5-dimethyl-3-(chlorophenylthio)hydantoin,
5,5-dimethyl-3-(benzylthio)hydantoin,
5,5-dimethyl-3-(tolylthio)hydantoin,
5,5-dimethyl-3-(nitrophenylthio)hydantoin,
5,5-dimethyl-3-(t-butylthio)hydantoin,
5,5-dimethyl-3-(ethylthio)hydantoin,
5,5-dimethyl-3-(propylthio)hydantoin,
5,5-dimethyl-3-(isopropylthio)hydantoin,
5,5-dimethyl-3-(n-dodecylthio)hydantoin,
1,4,5,6,7,7-hexchloro-N-(cyclohexylthio)bicyclo[2.2.1]hept-5-ene-2,3-dicarboximide,
1,4,5,6,7,7-hexachloro-N-(cyclooctylthio)bicyclo[2.2.1]hept-5-ene-dicarboximide,
1,4,5,6,7,7-hexachloro-N-(phenylthio)bicyclo[2.2.1]hept-5-ene-2,3-dicarboximide,
1,4,5,6,7,6-hexachloro-N-(chlorophenylthio)bicyclo[2.2.1]hept-5-ene-2,3-dicarboximide,
1,4,5,6,7,7-hexachloro-N-(benzylthio)bicyclo[2.2.1]hept-5-ene-2,3-dicarboximide,
1,4,5,6,7,7-hexachloro-N-(tolylthio)bicyclo[2.2.1]hept-5-ene-2,3-dicarboximide,
1,4,5,6,7,7-hexachloro-N-(nitrophenylthio)bicyclo[2.2.1]hept-5-ene-2,3-dicarboximide,
1,4,5,6,7,7-hexachloro-N-(t-butylthio)bicyclo[2.2.1]hept-5-ene-2,3-dicarboximide,
1,4,5,6,7,7-hexachloro-N-(ethylthio)bicyclo[2.2.1]hept-5-ene-2,3-dicarboximide,
N-(propylthio)bicyclo[2.2.1]hept-5-ene-2,3-dicarboximide,
1,4,5,6,7,7-hexachloro-N-(isopropylthio)bicyclo[2.2.1]hept-5-ene-2,3-dicarboximide,
1,4,5,6,7,7-hexachloro-N-(n-dodecylthio)bicyclo[2.2.1]hept-5-ene-2,3-dicarboximide,
N-(cyclohexylthio)-4-cyclohexene-1,2-dicarboximide,
N-(cyclooctylthio)-4-cyclohexene-1,2-dicarboximide,
N-(phenylthio)-4-cyclohexene-1,2-dicarboximide,
N-(chlorophenylthio)-4-cyclohexene-1,2-dicarboximide,
N-(benzylthio)-4-cyclohexene-1,2-dicarboximide,
N-(tolylthio)-4-cyclohexene-1,2-dicarboximide,
N-(nitrophenylthio)-4-cyclohexene-1,2-dicarboximide,
N-(t-butylthio)-4-cyclohexene-1,2-dicarboximide,
N-(ethylthio)-4-cyclohexene-1,2-dicarboximide,
N-(propylthio)-4-cyclohexene-1,2-dicarboximide,
N-(n-dodecylthio(-4-cyclohexene-1,2-dicarboximide,
N-(isopropylthio)-4-cyclohexene-1,2-dicarboximide,
N-phenylthio-3,4,5,6-tetrachlorophthalimide,
N-tolylthio-3,4,5,6-tetrachlorophthalimide,
N-chlorophenylthio-3,4,5,6-tetrachlorophthalimide,
N-benzylthio-3,4,5,6-tetrachlorophthalimide,
N-nitrophenylthio-3,4,5,6-tetrachlorophthalimide,
N-n-butylthio-3,4,5,6-tetrachlorophthalimide,
N-n-dodecylthio-3,4,5,6-tetrachlorophthalimide,
N-cyclohexylthio-3,4,5,6-tetrachlorophthalimide,
N-cyclooctylthio-3,4,5,6-tetrachlorophthalimide,
N-phenylthio-3,4,5,6-tetrabromophthalimide,
N-(ar-tolylthio)-3,4,5,6-tetrachlorophthalimide,
N-(ar-tolylthio)-3,4,5,6-tetrabromophthalimide,
N-(phenylthio)naphthalimide,
N-(tolylthio)naphthalimide,
N-(chlorophenylthio)naphthalimide,
N-(benzylthio)naphthalimide,
N-(nitrophenylthio)naphthalimide,
N-(n-butylthio)naphthalimide,
N-(n-dodecylthio)naphthalimide,
N-(cyclohexylthio)naphthalimide,
N-(cyclooctylthio)naphthalimide, and
N,N'-bis(ar-tolylthio)-1,2,4,5-benzenetetracarboxylic-1,2:4,5-diimide.

Rubber stocks containing delayed action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, organic accelerators for vulcanization, and antidegradants. For the purposes of this invention, sulfur-vulcanizing agent means elemental sulfur or sulfur-containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexyl sulfenamide, 2-mercaptobenzothiazole, N-tert-butyl-2-benzothiazole sulfenamide, 2-benzothiazolyl diethyldithiocarbamate, and 2-(morpholinothio) benzothiazole can be used. Amine salts of mercaptobenzothiazole accelerators, for example, the t-butyl amine salt of mercaptobenzothiazole, like salts of morpholine and 2,6-dimethyl morpholine, can be used in the invention. Thiazole accelerators other than aromatic can be used. Stocks containing accelerators, for example, the tetramethylthiuram disulfides, tetramethylthiuram monosulfide, aldehyde amine condensation products, thiocarbamylsulfenamides, thioureas, xanthates, and guanidine derivatives, are substantially improved using the process of our invention. Examples of thiocarbamylsulfenamide accelerators are shown in U.S. Pat. 2,381,392, Smith assigned to Firestone; 2,388,236, Cooper assigned to Monsanto; 2,424,921, Smith assigned to Firstone; and British Pat. 880,912, Dadson assigned to Imperial Chemical Industries Limited. The invention is applicable to accelerator mixtures. The invention is applicable to stocks containing amine antidegradants. Rubber mixes containing antidegradants, for example, N-1,3-dimethylbutyl-N'-phenyl-p-phenylenediamine, N,N'-bis(1,4 - dimethylpentyl)-p-phenylenediamine, and other phenylenediamines, ketone, ether, and hydroxy antidegradants and mixtures thereof, are substantially improved using the process of our invention. Mixtures of antidegradants, for example, a mixture of N-1,3 - dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself or isoprene, copolymers of 1,3-butadiene with other monomers, for example, styrene, acrylonitrile, and isobutylene, and methyl methacrylate. The invention relates to diene rubbers, and the terms rubber and diene rubber are synonymous for the purpose of this invention.

The bis(thioimido)alkanes of this invention are synthesized according to the following equations:

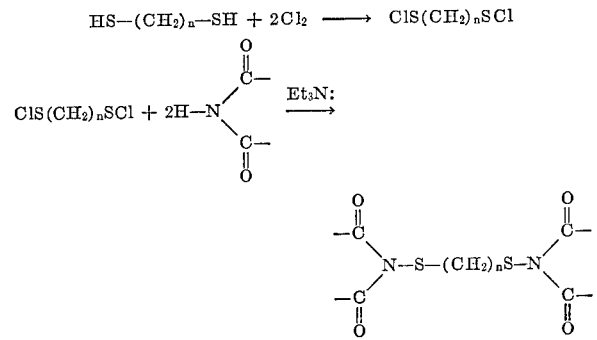

The mercaptan is dissolved in n-pentane and then chlorine gas is passed through the resulting solution at −5° to 5° C. The orange-yellow sulfenyl chloride is added dropwise to a solution of imide and triethylamine in dimethylformamide. The reaction mixture is allowed to stir for 30 minutes and it is then diluted with water. The product is filtered and recrystallized.

To prepare 1,6 - (2 - thiophthalimido)hexane of the formula

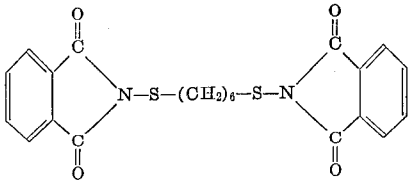

15 grams (0.1 mole) of 1,6-n-hexanedithiol is dissolved in 100 ml. of n-pentane in a 250 ml. round-bottomed three-necked flask equipped with a mechanical stirrer, condenser, a thermometer, and a gas inlet tube. Chlorine gas, 16.0 grams (0.22 mole), is passed through the solution in the flask at −5° to 5° C. over a 20-minute period. The yellow solution of the sulfenyl chloride is added dropwise to a solution of 28 grams (0.1 mole) of phthalimide and 26 grams (0.26 mole) of triethylamine in 150 ml. of dimethylformamide over a period of 30 minutes. The reaction temperature rises 24° to 40° C. upon this addition. The reaction mixture is stirred for 30 minutes and then it is diluted with two liters of cold water. The precipitate is filtered and dried. The precipitate weighs 37.5 grams which is an 85% yield. Recrystallization of the product gives a white crystalline 1,6-bis(2-thiophthalimido)hexane with a melting point of 171° to 172° C. Elemental analysis of the 1,6-bis(2-thiophthalimido)hexane shows 6.12% nitrogen and 14.53% sulfur. Calculated percentages for $C_{22}H_{20}N_2O_4S_2$ are 6.36% nitrogen and 14.55% sulfur.

An 89% yield of 1,6-bis(2-thiosuccinimido)hexane is obtained using the synthesis described above. The melting point is 118°–120° C. Elemental analysis of the 1,6-bis(2-thiosuccinimido)hexane shows 7.74% nitrogen and 19.15% sulfur. Calculated percentages for $C_{14}H_{20}N_2O_4S_2$ are 8.13% nitrogen and 18.61% sulfur.

An 85% yield of 1,4-bis(2-thiophthalimido)butane is obtained using the synthesis described above. The melting point is 210°–213° C. (decomposes).

The following table illustrates the invention in greater detail and the best mode for carrying it out, but is not to be construed as to narrow the scope of our invention. For the rubber stocks tested and described, infra, as illustrative of the invention, Mooney scorch times at 121° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, curing characteristics are calculated from the time required to cure the stocks at 144° C. by means of the Monsanto Oscillating Disc Rheometer which is described by Decker, Wise, and Guerry in Rubber World, December 1962, page 68. From the Rheometer data, R.M.T. is the maximum torque in Rheometer units, $t_2$ is the time in minutes for a rise of two Rheometer units above the minimum reading of the rubber sample, and $t_{90}$ is the time required to obtain a torque 90% of the maximum.

The trademarks of some compounds used in the practice of this invention are Santocure MOR and Santoflex 13. Santocure MOR is the accelerator 2-(morpholinothio) benzothiazole. Santoflex 13 is the antidegradant N-1,3-dimethylbutyl-N'-phenyl-p-phenylenediamine.

The table illustrates the results of using 1,6-bis-(2-thiophthalimido)hexane and 1,4-bis(2-thiophthalimido)butane as premature vulcanization inhibitors in stocks of natural rubber containing the antidegradant Santoflex 13 and the accelerator Santocure MOR. From the data of the table it will be noted that 1,6-bis(2-thiophthalimido)hexane and 1,4-bis(2-thiophthalimido)butane are quite active in the presence of the accelerator as premature vulcanization inhibitors.

The ingredients for the table are as follows:

| Stocks contain— | Parts by weight |
|---|---|
| Natural rubber | 100 |
| Carbon black | 45 |
| Zinc oxide | 3 |
| Stearic acid | 2 |
| Hydrocarbon softener | 5 |
| Santoflex 13 | 2 |
| Santocure MOR | 0.5 |
| Sulfur | 2.5 |

Premature vulcanization inhibitor—as indicated.

There are seven stocks in the table and stock 1 is the control. Stocks 2–7 contain the following concentrations of premature vulcanization inhibitor.

| Stk: | Inhibitor | Parts by weight |
|---|---|---|
| 2 | 1,6-bis(2-thiophthalimido)hexane | 0.22 |
| 3 | do | 0.44 |
| 4 | do | 0.88 |
| 5 | 1,4-bis(2-thiophthalimido)butane | 0.24 |
| 6 | do | 0.48 |
| 7 | do | 0.96 |

TABLE

| | Stock | | | | | | |
|---|---|---|---|---|---|---|---|
| | 1 | 2 | 3 | 4 | 5 | 6 | 7 |
| Mooney scorch at 121° C.: | | | | | | | |
| $t_5$ | 25.3 | 37.4 | 47.5 | 60.8 | 35.2 | 51.0 | 64.8 |
| Percent increase in scorch delay | | 48 | 88 | 140 | 39 | 102 | 156 |
| Rheometer at 144° C.: | | | | | | | |
| $t_2$ | 8.0 | 10.0 | 12.2 | 15.0 | 9.3 | 11.5 | 14.8 |
| $t_{90}$ | 21.5 | 22.5 | 26.3 | 29.5 | 22.6 | 25.2 | 29.5 |
| R.M.T | 56.5 | 58.6 | 60.4 | 62.0 | 57.5 | 58.0 | 59.0 |
| $k_2$ | 0.183 | 0.183 | 0.173 | 0.173 | 0.173 | 0.187 | 0.183 |

Comparable results to those in the table illustrating utility are obtained with the inhibitors of this invention which are not illustrated.

Concentration studies show that the inhibitors of this invention are effective in rubber at concentrations of 0.05 to 5.0 parts per hundred. Concentrations from 0.22 to 3.0 parts per hundred are preferred.

It is intended to cover all changes and modifications of the examples of the invention herein chosen for purposes of disclosure which do not constitute departures from the spirit and scope of the invention.

We claim:

1. The method of inhibiting premature vulcanization of a vulcanizable diene rubber containing a sulfur vulcanizing agent and an organic vulcanization accelerating agent, which comprises:

incorporating therein in an amount effective to inhibit premature vulcanization a compound of the formula R'—S—R—S—R' wherein R contains 1 to 8 carbon atoms and is alkylene, arylene, or cycloalkylene and R' is an imido radical.

2. The method of inhibiting premature vulcanization according to claim 1 wherein R' is phthalimido.

3. The method of inhibiting premature vulcanization according to claim 1 which includes the additional step of heating the mixture at a vulcanizing temperature.

4. The method of inhibiting premature vulcanization of a vulcanizable diene rubber containing a sulfur vulcanizing agent and an organic vulcanization accelerating agent which comprises:

incorporating therein in an amount effective to inhibit premature vulcanization a compound of the formula R'—S—R—S—R' wherein R is alkylene of 1 to 8 carbon atoms and R' is an imido radical.

5. The method of inhibiting premature vulcanization according to claim 4 wherein R' is phthalimido and R is alkylene of 4 to 8 carbon atoms.

6. The method of inhibiting premature vulcanization according to claim 4 which includes the additional step of heating the mixture at a vulcanizing temperature.

7. The method of inhibiting premature vulcanization according to claim 4 wherein the inhibitor is 1,6-bis(2-thio-phthalimido)hexane.

8. The method of inhibiting premature vulcanization according to claim 4 wherein the inhibitor is 1,4-bis(2-thio-phthalimido)butane.

9. An unvulcanized rubber composition comprising a vulcanizable diene rubber, a sulfur vulcanizing agent, an organic vulcanization accelerating agent, and an amount effective to inhibit premature vulcanization of a compound of the formula R'—S—R—S—R' wherein R contains 1 to 8 carbon atoms and is alkylene, arylene, or cycloalkylene and R' is an imido radical.

10. An unvulcanized rubber composition of claim 9 wherein R' is phthalimido.

References Cited

UNITED STATES PATENTS

| 2,171,901 | 9/1939 | Wilson | 260—780 |
| 2,553,776 | 5/1951 | Kittleson | 260—326 |
| 3,223,674 | 12/1965 | Shloss | 260—41 |
| 3,427,319 | 2/1969 | Coran | 260—309.2 |

FOREIGN PATENTS

| 164,670 | 10/1964 | Russia | 260—79.5 |

JOSEPH L. SCHOFER, Primary Examiner

C. A. HENDERSON, JR., Assistant Examiner

U.S. Cl. X.R.

260—281, 309.5, 326, 780, 786, 809